(12) United States Patent
Takeshita

(10) Patent No.: US 9,594,701 B2
(45) Date of Patent: Mar. 14, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Atsushi Takeshita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/715,095

(22) Filed: May 18, 2015

(65) Prior Publication Data
US 2016/0179708 A1     Jun. 23, 2016

(30) Foreign Application Priority Data

Dec. 19, 2014   (JP) ................................. 2014-257134

(51) Int. Cl.
*G06F 12/10*   (2016.01)
*G06F 13/16*   (2006.01)

(52) U.S. Cl.
CPC ...... *G06F 13/1642* (2013.01); *G06F 12/1072* (2013.01); *G06F 13/1663* (2013.01); *G06F 2212/65* (2013.01)

(58) Field of Classification Search
CPC ...... G06F 12/00; G06F 12/0284; G06F 12/10; G06F 12/109; G06F 9/38; G06F 12/08; G06F 13/16; G06F 12/02; G06F 9/52; G06F 9/526; G06F 9/3004; G06F 9/30087; G06F 13/1605
See application file for complete search history.

(56) References Cited

U.S. PATENT DOCUMENTS

| | | | |
|---|---|---|---|
| 2008/0005794 A1* | 1/2008 | Inoue | G06F 21/52 726/22 |
| 2008/0098196 A1* | 4/2008 | Miyamoto | G06F 12/1081 711/203 |
| 2010/0088477 A1* | 4/2010 | Katsumata | G06F 12/0284 711/153 |

(Continued)

FOREIGN PATENT DOCUMENTS

| | | |
|---|---|---|
| JP | 11-015732 A | 1/1999 |
| JP | 2010-128560 A | 6/2010 |

*Primary Examiner* — Mano Padmanabhan
*Assistant Examiner* — Jean Edouard
(74) *Attorney, Agent, or Firm* — Sughrue Mion, PLLC

(57) ABSTRACT

An information processing apparatus includes first and second central processing units, a communication unit, and a memory. The first and second central processing units operate based on first and second operating systems, respectively. The communication unit controls communication between the first and second operating systems. The memory includes first and second memory areas used respectively by the first and second operating systems. The first operating system includes a memory access requesting unit. The memory access requesting unit sends, to the second operating system via the communication unit, a request to write information to be moved from the first memory area to a virtual memory and a request to read information to be moved from the virtual memory to the first memory area. The second operating system writes to and reads from the second memory area, the information indicated by the write and read requests, respectively.

5 Claims, 3 Drawing Sheets

(56) References Cited

U.S. PATENT DOCUMENTS

| | | | |
|---|---|---|---|
| 2012/0260017 A1* | 10/2012 | Mine | G06F 9/544 |
| | | | 710/308 |
| 2013/0013871 A1* | 1/2013 | Ogihara | G06F 11/2089 |
| | | | 711/156 |
| 2013/0246690 A1* | 9/2013 | Haneda | G06F 12/0246 |
| | | | 711/103 |
| 2014/0229686 A1* | 8/2014 | Tsirkin | G06F 9/45533 |
| | | | 711/147 |
| 2014/0250286 A1* | 9/2014 | Kondo | G06F 9/45533 |
| | | | 711/170 |
| 2014/0298026 A1* | 10/2014 | Isozaki | H04L 9/0825 |
| | | | 713/171 |
| 2015/0134892 A1* | 5/2015 | Goda | H04N 1/21 |
| | | | 711/103 |
| 2015/0277765 A1* | 10/2015 | Watanabe | G06F 3/06 |
| | | | 711/150 |
| 2016/0004539 A1* | 1/2016 | Kawano | G06F 9/441 |
| | | | 713/100 |
| 2016/0012003 A1* | 1/2016 | Chawla | G06F 13/102 |
| | | | 710/308 |

* cited by examiner

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-257134 filed Dec. 19, 2014.

BACKGROUND

Technical Field

The present invention relates to an information processing apparatus, an information processing method, and a non-transitory computer readable medium.

SUMMARY

According to an aspect of the present invention, there is provided an information processing apparatus including a first central processing unit, a second central processing unit, a communication unit, and a memory. The first central processing unit operates based on a first operating system having a virtual memory function. The second central processing unit operates based on a second operating system. The communication unit controls communication between the first operating system and the second operating system. The memory includes a first memory area used by the first operating system and a second memory area used by the second operating system. The first operating system includes a memory access requesting unit. The memory access requesting unit sends, to the second operating system via the communication unit, a write request to write information to be moved from the first memory area to a virtual memory and a read request to read information to be moved from the virtual memory to the first memory area. The second operating system writes, to the second memory area, the information indicated by the write request sent by the memory access requesting unit and reads, from the second memory area, the information indicated by the read request sent by the memory access requesting unit.

BRIEF DESCRIPTION OF THE DRAWINGS

Exemplary embodiments of the present invention will be described in detail based on the following figures, wherein.

DETAILED DESCRIPTION

Figure 1:
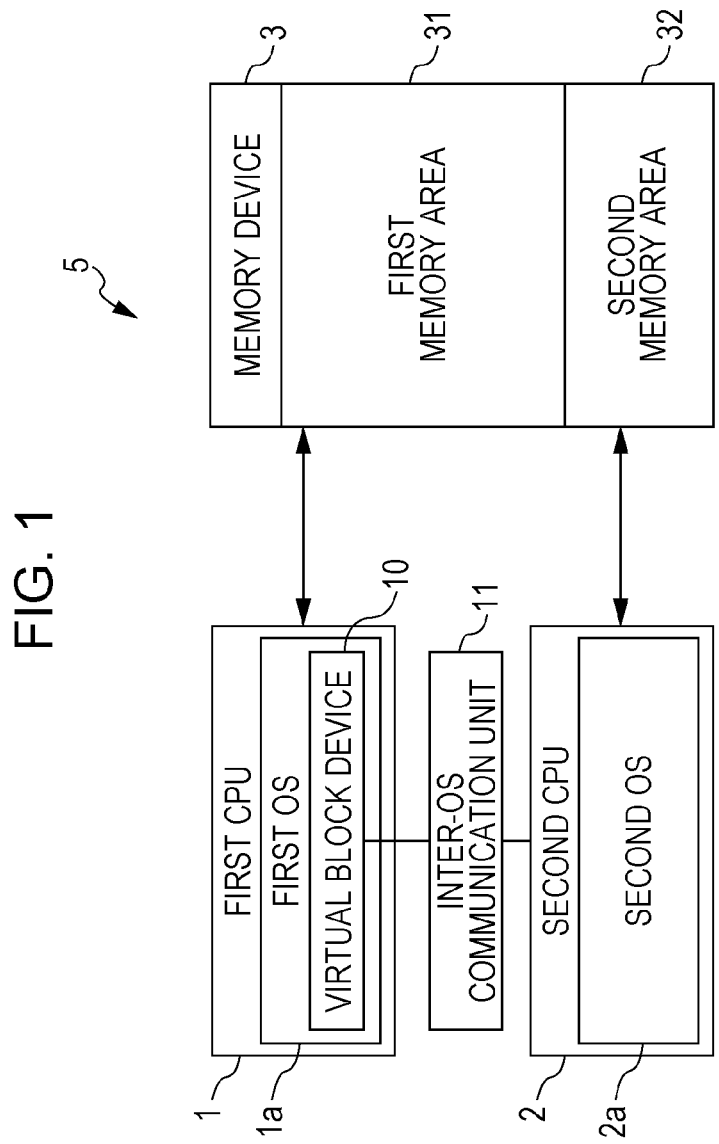
FIG. 1 is a block diagram illustrating an example of a configuration of an information processing apparatus according to a first exemplary embodiment.

First Exemplary Embodiment
Configuration of Information Processing Apparatus
FIG. 1 is a block diagram illustrating an example of a configuration of an information processing apparatus according to a first exemplary embodiment.

An information processing apparatus 5 includes a first central processing unit (CPU) 1, a second CPU 2, and a memory device 3. Each of the first CPU 1 and the second CPU 2 controls individual components and executes various programs. The memory device 3 is a volatile semiconductor memory, such as a random access memory (RAM) to which information is writable and from which information is readable. The information processing apparatus 5 is a loosely coupled multi-processor system in which the first CPU 1, the second CPU 2, and the memory device 3 are connected to one another via a system bus.

The information processing apparatus 5 is, for example, an apparatus having image-formation-related functions such as a copy function, a scan function, a print function, and a fax function, and network-related functions such as coordination with cloud and web services. The information processing apparatus 5 includes functional units such as an optical scanning unit (not illustrated), a printing unit (not illustrated), a fax unit (not illustrated), and a communication unit (not illustrated) which are controlled by the first CPU 1 and the second CPU 2.

The first CPU 1 operates based on a first operating system (OS) 1a which is a general-purpose OS having a lower real-time processing capability than a second OS 2a. The first OS 1a is, for example, Linux (registered trademark) and is typically used to control functional units that implement network-related functions such as coordination with cloud and web services.

The first OS 1a also has a virtual memory function which allows a secondary memory device that is accessed via a block device to be virtually handled as a memory in addition to a directly accessible primary memory device.

The second CPU 2 operates based on the second OS 2a which is a real-time OS. The second OS 2a is, for example, ITRON (registered trademark) or vxWorks (registered trademark) and is typically used to control functional units that implement image-formation-related functions such as a copy function, a scan function, a print function, and a fax function. Note that the term "real-time processing capability" refers to a capability of completing a job within a predetermined period of time in response to a request to execute the job, and the term "real-time OS" refers to an OS having the real-time processing capability.

The first OS 1a and the second OS 2a respectively function as a result of the first CPU 1 and the second CPU 2 loading and executing programs stored in a ROM (not illustrated), for example.

The memory device 3 includes a first memory area 31 used by the first OS 1a and a second memory area 32 used by the second OS 2a but does not include a memory area shared by the first OS 1a and the second OS 2a. Although a single memory device 3 is illustrated in FIG. 1, the information processing apparatus 5 may include multiple memory devices 3. In such a case, the first memory area 31 and the second memory area 32 may be provided in different memory devices.

The first OS 1a includes a virtual block device 10 capable of swapping out information stored in the first memory area 31 and writing the information thereto. The information written to the virtual block device 10 is transferred to the second OS 2a via an inter-OS communication unit 11 (described later) and is written to the second memory area 32. In response to a request to write back (swap in) swapped-out information made by the first OS 1a, the information in the second memory area 32 is written back to the first memory area 31 via the inter-OS communication unit 11 and the virtual block device 10. The virtual block device 10 is implemented by a device file, for example.

The inter-OS communication unit 11 controls communication between the first OS 1a and the second OS 2a via the system bus. The first OS 1a and the second OS 2a communicate with each other by sending and receiving messages.

Operations of Information Processing Apparatus

Now, operations according to the first exemplary embodiment will be described in terms of (1) a basic operation, (2) a swap-out operation, and (3) a swap-in operation.

(1) Basic Operation

Upon receipt of a request, the first CPU 1 and the second CPU 2 respectively process the received request by using functions of the first OS 1a and the second OS 2a. While the request is being processed, information being processed is temporarily stored in the first memory area 31 and the second memory area 32. That is, the first CPU 1 and the second CPU 2 respectively use the first memory area 31 and the second memory area 32 as a directly accessible primary memory device.

The first OS 1a has a virtual memory function. Accordingly, the first CPU 1 writes, to a secondary memory device, information that is not used for a while among pieces of information stored in the first memory area 31. The following describes an operation performed when the first OS 1a uses, as the secondary memory device, the second memory area 32 that is used by the second OS 2a as the primary memory device.

(2) Swap-out Operation

To swap out information stored in the first memory area 31, the first OS 1a writes the information to the virtual block device 10.

The virtual block device 10 transfers the information written thereto to the second OS 2a via the inter-OS communication unit 11.

The second OS 2a writes the received information to the second memory area 32.

The above-described operation allows the first OS 1a to virtually expand a memory area and to store information being processed in an available area created in the first memory area 31.

(3) Swap-in Operation

The first OS 1a then requests the virtual block device 10 to swap in the swapped-out information stored in the second memory area 32 before processing the information.

The virtual block device 10 requests, via the inter-OS communication unit 11, the second OS 2a to read the information.

The second OS 2a reads the information stored in the second memory area 32 and sends the information to the virtual block device 10 via the inter-OS communication unit 11.

The virtual block device 10 then writes the received information to the first memory area 31.

Second Exemplary Embodiment

In a second exemplary embodiment, a case where the first OS 1a supports a 32-bit virtual address space will be described. That is, a case will be described where the first OS 1a is permitted to use a memory area of approximately 3 gigabytes (GB) of the primary memory device and is not permitted to use the rest of the memory area even if the primary memory device has a memory capacity greater than 3 GB.

Configuration of Information Processing Apparatus

Figure 2:
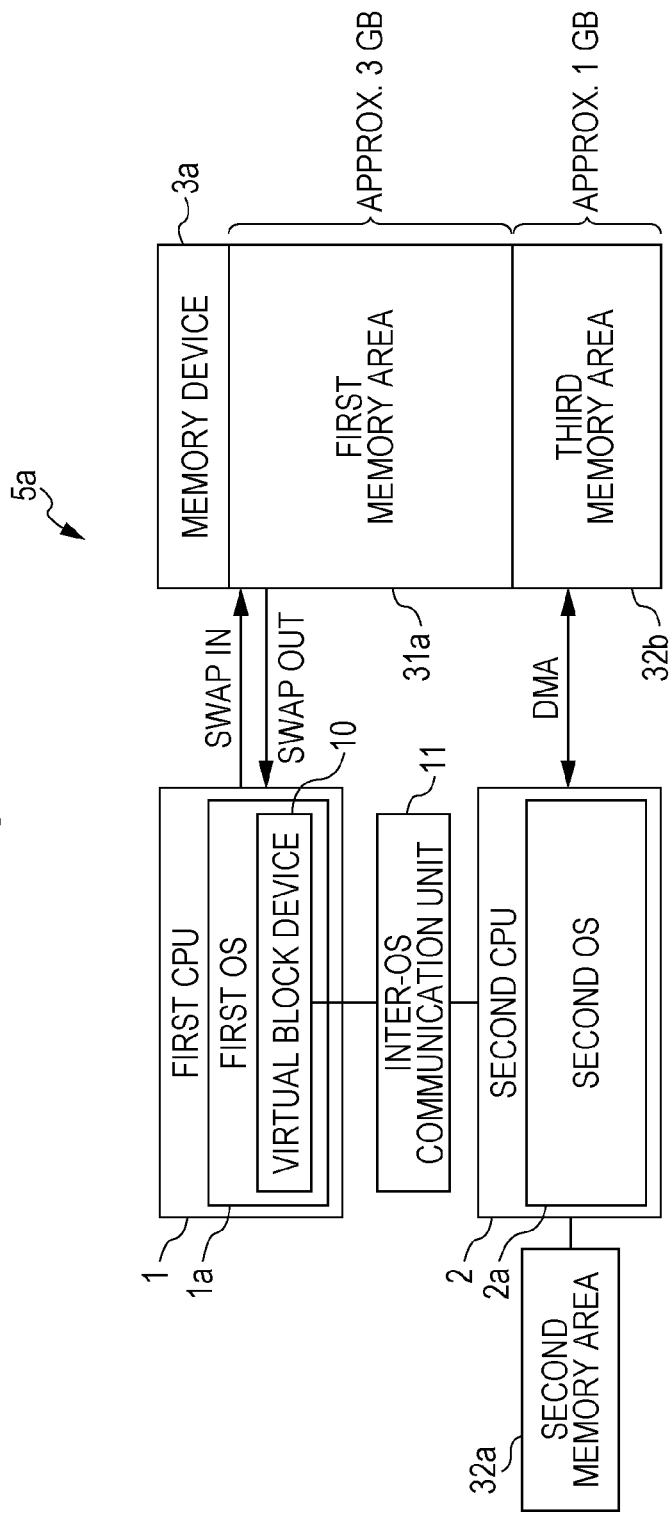
FIG. 2 is a block diagram illustrating an example of a configuration of an information processing apparatus according to a second exemplary embodiment.

FIG. 2 is a block diagram illustrating an example of a configuration of an information processing apparatus according to the second exemplary embodiment.

An information processing apparatus 5a includes the first CPU 1, the second CPU 2, a memory device 3a, and a memory device which the second OS 2a uses as a second memory area 32a. The information processing apparatus 5a is a loosely coupled multi-processor system in which the first CPU 1, the second CPU 2, the memory device 3a, and the memory device are connected to one another via a system bus.

The memory device 3a is, for example, a RAM having a capacity of 4 GB. A first memory area 31a used by the first OS 1a among the memory area of the memory device 3a is approximately 3 GB. The rest of the memory area, that is, a third memory area 32b of 1 GB, is made available to the second OS 2a.

The second memory area 32a is provided in a memory device different from the memory device 3a in FIG. 2; however, the second memory area 32a may be prepared as another memory area in the memory device 3a.

The virtual block device 10 transfers information written thereto to the second OS 2a via the inter-OS communication unit 11. The information is then directly written to the third memory area 32b by using, for example, direct memory access (DMA) without being copied in the second memory area 32a. In response to a swap-in request from the first OS 1a, the information written to the third memory area 32b is written back to the first memory area 31a via the inter-OS communication unit 11 and the virtual block device 10.

Operations of Information Processing Apparatus

Now, operations according to the second exemplary embodiment will be described in terms of (1) a basic operation, (2) a swap-out operation, and (3) a swap-in operation.

(1) Basic Operation

Upon receipt of a request, the first CPU 1 and the second CPU 2 respectively process the received request by using functions of the first OS 1a and the second OS 2a. While the request is being processed, information being processed is temporarily stored in the first memory area 31a and the second memory area 32a. That is, the first CPU 1 and the second CPU 2 respectively use the first memory area 31a and the second memory area 32a as a directly accessible primary memory device.

The first OS 1a has a virtual memory function. Accordingly, the first CPU 1 writes, to a secondary memory device, information that is not used for a while among pieces of information stored in the first memory area 31a. The following describes an operation performed when the first OS 1a uses, as the secondary memory device, the third memory area 32b that is used by the second OS 2a as the secondary memory device.

(2) Swap-out Operation

To swap out information stored in the first memory area 31a, the first OS 1a writes the information to the virtual block device 10.

The virtual block device 10 transfers the information written thereto to the second OS 2a via the inter-OS communication unit 11.

The second OS 2a writes the received information to the third memory area 32b.

The above-described operation allows the first OS 1a to virtually expand a memory area and to store information being processed in an available area created in the first memory area 31a.

(3) Swap-in Operation

The first OS 1a then requests the virtual block device 10 to swap in the swapped-out information stored in the third memory area 32b before processing the information.

The virtual block device 10 requests, via the inter-OS communication unit 11, the second OS 2a to read the information.

The second OS 2a reads the information stored in the third memory area 32b and sends the information to the virtual block device 10 via the inter-OS communication unit 11.

The virtual block device 10 writes the received information to the first memory area 31a.

The above-described operation allows the first OS 1a to use, as a virtual memory area, the third memory area 32b which is a part of the memory area of the memory device 3a which the first OS 1a is not permitted to access.

The memory device 3a is a RAM. This configuration makes the speed of processing higher than in the case of using a device such as a hard disk drive as the virtual memory, even if communication between the first OS 1a and the second OS 2a is taken into account.

Third Exemplary Embodiment

In a third exemplary embodiment, a case where the configuration according to the second exemplary embodiment further includes a compressor will be described.

Configuration of Information Processing Apparatus

Figure 3:
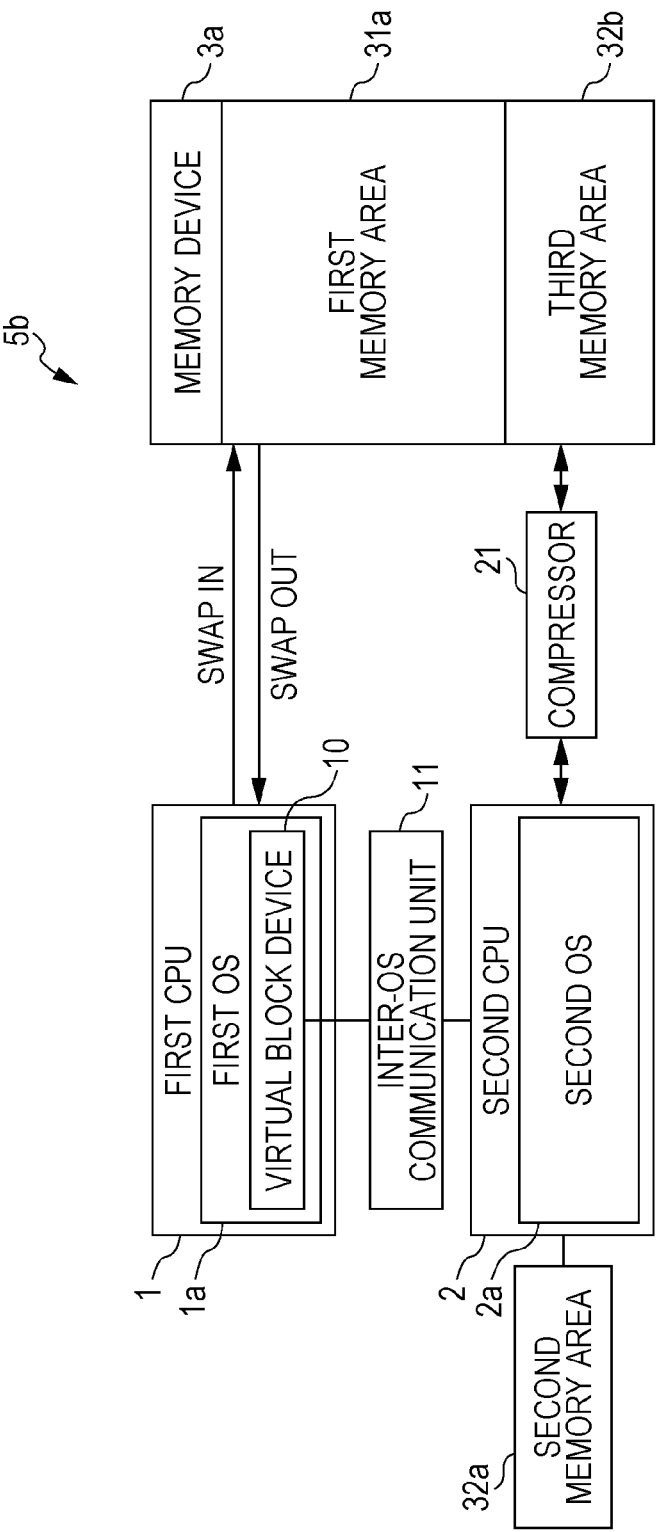
FIG. 3 is a block diagram illustrating an example of a configuration of an information processing apparatus according to a third exemplary embodiment.

FIG. 3 is a block diagram illustrating an example of a configuration of an information processing apparatus according to a third exemplary embodiment.

An information processing apparatus 5b includes the first CPU 1, the second CPU 2, the memory device 3a, and a memory device which the second OS 2a uses as the second memory area 32a. The information processing apparatus 5b is a loosely coupled multi-processor system in which the first CPU 1, the second CPU 2, the memory device 3a, and the memory device are connected to one another via a system bus.

The information processing apparatus 5b further includes a compressor 21 that compresses information and reduces the amount of data. The compressor 21 compresses information to be written to the third memory area 32b by the second OS 2a.

Operations of Information Processing Apparatus

Now, operations according to the third exemplary embodiment will be described in term of (1) a swap-out operation and (2) a swap-in operation.

(1) Swap-out Operation

To swap out information stored in the first memory area 31a, the first OS 1a writes the information to the virtual block device 10.

The virtual block device 10 transfers the information written thereto to the second OS 2a via the inter-OS communication unit 11.

The second OS 2a compresses the received information by using the compressor 21 and writes the compressed information to the third memory area 32b.

(2) Swap-in Operation

The first OS 1a then requests the virtual block device 10 to swap in the swapped-out information stored in the third memory area 32b before processing the information.

The virtual block device 10 requests, via the inter-OS communication unit 11, the second OS 2a to read the information.

The second OS 2a reads the information stored in the third memory area 32b, decompresses the information, and sends the decompressed information to the virtual block device 10 via the inter-OS communication unit 11.

The virtual block device 10 writes the received information to the first memory area 31a.

The above-described operation allows the first OS 1a to use, as a virtual memory area, the third memory area 32b which is a part of the memory area of the memory device 3a which the first OS 1a is not permitted to access and to store an increased amount of information in the virtual memory area because the information is compressed by the compressor 21.

Even if the third memory area 32b is an area which the first OS 1a is permitted to access, compressing information through the above-described operation makes the total amount of memory used smaller than that used in the case of directly storing the information.

Other Exemplary Embodiments

The present invention is not limited to the exemplary embodiments described above, and various modifications may occur within the scope not departing from the gist of the present invention.

The order of the steps of the operations described in the exemplary embodiments may be changed, some of the steps may be omitted, or a step may be added, within the scope not changing the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a first central processing unit configured to execute a first operating system having a virtual memory function of accessing secondary memory resources;
    a second central processing unit configured to execute a second operating system;
    a communication unit that controls communication between the first operating system and the second operating system; and
    a memory coupled to the first central processing unit and the second central processing unit, the memory comprising a first memory area permitted to be used by the first operating system and a second memory area permitted to be used by the second operating system and not permitted to be used by the first operating system,
    wherein the first operating system is configured to send, to the second operating system, a write request to write information to memory resources accessible to the second operating system, and to send a read request to read information from the memory resources accessible to the second operating system, and
    wherein the second operating system is configured to write, to the second memory area, the information indicated by the write request, and to read, from the second memory area, the information indicated by the read request and provide the read information to the first operating system.

2. An information processing method comprising:
    sending, from a first operating system having a virtual memory function of accessing secondary memory resources executed by a first central processing unit coupled to a memory comprising a first memory area permitted to be used by the first operating system and a second memory area permitted to be used by a second operating system and not permitted to be used by the first operating system, to the second operating system executed by a second central processing unit coupled to the memory, a write request to write information to memory resources accessible to the second operating system;

sending, from the first operating system, to the second operating system, a read request to read the information from the memory resources accessible to the second operating system;

receiving, from the second operating system, the information stored in the second memory area of the first memory.

3. A non-transitory computer readable medium storing a program causing a computer to execute a process for information processing, the process comprising:

sending, from a first operating system having a virtual memory function of accessing secondary memory resources executed by a first central processing unit coupled to a memory comprising a first memory area permitted to be used by the first operating system and a second memory area permitted to be used by a second operating system and not permitted to be used by the first operating system, to the second operating system executed by a second central processing unit coupled to the memory, a write request to write information to memory resources accessible to the second operating system;

sending, from the first operating system, to the second operating system, a read request to read the information from the memory resources accessible to the second operating system;

receiving, from the second operating system, the information stored in the second memory area of the first memory.

4. The information processing apparatus according to claim 1, wherein the memory comprises a first memory including the first memory area and a second memory structurally separate from the first memory and including the second memory area.

5. The information processing apparatus according to claim 1, wherein in response to the information being read from the second memory area, the information is written to the first memory area, and wherein the memory comprises a first memory including the first memory area and a second memory structurally separate from the first memory and including the second memory area.

* * * * *